United States Patent  
Cheung et al.

(10) Patent No.: US 12,361,697 B2
(45) Date of Patent: Jul. 15, 2025

(54) MULTI-TASK DEEP-LEARNING METHOD AND SYSTEM TO CLASSIFY DIABETIC MACULAR EDEMA FOR DIFFERENT OPTICAL COHERENCE TOMOGRAPHY DEVICES

(71) Applicant: The Chinese University of Hong Kong, Hong Kong (CN)

(72) Inventors: Yim Lui Carol Cheung, Hong Kong (CN); Pheng Ann Heng, Hong Kong (CN); Fangyao Tang, Hong Kong (CN); Xi Wang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 391 days.

(21) Appl. No.: 17/822,524

(22) Filed: Aug. 26, 2022

(65) Prior Publication Data
US 2024/0071063 A1   Feb. 29, 2024

(51) Int. Cl.
*G06V 10/82* (2022.01)
*G06T 7/00* (2017.01)
(Continued)

(52) U.S. Cl.
CPC ............ *G06V 10/82* (2022.01); *G06T 7/0012* (2013.01); *G06V 10/764* (2022.01);
(Continued)

(58) Field of Classification Search
CPC .. G06V 10/82; G06V 10/7715; G06V 10/764; G06T 7/0012; G06T 2207/10101; G06T 2207/20084; G06T 2207/30041
See application file for complete search history.

(56) References Cited

U.S. PATENT DOCUMENTS

2017/0119247 A1* 5/2017 Walsh .................. A61B 3/0041
2020/0075155 A1* 3/2020 Huang .................. G16H 30/20
(Continued)

OTHER PUBLICATIONS

Tang, F. et al., "A Multitask Deep-Learning System to Classify Diabetic Macular Edema for Different Optical Coherence Tomography Devices: A Multicenter Analysis," Diabetes Care, Sep. 2021, 44:2078-2088, American Diabetes Association.
(Continued)

*Primary Examiner* — John J Lee
(74) *Attorney, Agent, or Firm* — SALIWANCHIK, LLOYD & EISENSCHENK (57) ABSTRACT

A deep-learning method and systems for analyzing optical coherence tomography (OCT) images based on a convolutional neural network are provided. The method includes extracting a feature from one or more three-dimensional OCT volumetric scan images and classifying the OCT images with respect to diabetic macular edema (DME) based on results the feature extracted. The step of extracting a feature from one or more three-dimensional OCT volumetric scan images is performed by a neural network such as a neural network based on a ResNet-34 architecture. The method can further include extracting a feature from one or more two-dimensional (2D) OCT B-scan images and classifying the OCT images with respect to DME based on results of the 2D feature extracted. The step of extracting a feature from one or more 2D OCT B-scan images is performed by a neural network such as a neural network based on a ResNet-18 architecture.

16 Claims, 6 Drawing Sheets

(51) Int. Cl.
*G06V 10/764* (2022.01)
*G06V 10/77* (2022.01)
(52) U.S. Cl.
CPC ............... *G06V 10/7715* (2022.01); *G06T 2207/10101* (2013.01); *G06T 2207/20084* (2013.01); *G06T 2207/30041* (2013.01)

(56) References Cited

U.S. PATENT DOCUMENTS

2021/0386285 A1* 12/2021 Walsh .................. A61B 3/0025
2023/0005151 A1* 1/2023 Su ......................... G06V 10/25

OTHER PUBLICATIONS

Sun, Z. et al., "OCT Angiography Metrics Predict Progression of Diabetic Retinopathy and Development of Diabetic Macular Edema," American Academy of Ophthalmology, Dec. 2019, 126(12):1675-1684, Elsevier Inc.
Ran, A. R. et al., "Detection of glaucomatous optic neuropathy with spectral-domain optical coherence tomography: a retrospective training and validation deep-learning analysis," Lancet Digital Health, Aug. 2019, 1:e172-e182, Elsevier Ltd.
Ting, D. S. W. et al., "Development and Validation of a Deep Learning System for Diabetic Retinopathy and Related Eye Diseases Using Retinal Images From Multiethnic Populations With Diabetes," JAMA, 2017, 318(22):2211-2223, American Model Association.
Tan, G. S. et al., "Diabetic macular oedema," Lancet Diabetes Endocrinology, Aug. 2, 2016, 5:143-155.
Scanlon, P. H. et al., "The English National Screening Programme for diabetic retinopathy 2003-2016," Acta Diabetol, 2017, 54:515-525, Springer.
Garvican, L. et al., "Preservation of sight in diabetes: developing a national risk reduction programme," Diabetic Medicine, 2000, 17:627-634, Diabetes UK.
Nguyen, H. V. et al., "Cost-effectiveness of a National Telemedicine Diabetic Retinopathy Screening Program in Singapore," American Academy of Ophthalmology, Dec. 2016, 123(12):2571-2580, Elsevier Inc.
Wang, L. Z. et al., "Availability and variability in guidelines on diabetic retinopathy screening in Asian countries," Br J Ophthalmol, Mar. 14, 2017, 101:1352-1360.
Solomon, S. D. et al., "Diabetic Retinopathy: A Position Statement by the American Diabetes Association," Diabetes Care, Mar. 2017, 40:412-418, American Diabetes Association.
Wong, T. Y. et al., "Guidelines on Diabetic Eye Care," American Academy of Ophthalmology, Oct. 2018, 125(10):1608-1622, Elsevier Inc.
Wong, R. L. M. et al., "Are we making good use of our public resources? The false-positive rate of screening by fundus photography for diabetic macular oedema," Hong Kong Medical Journal, Aug. 2017, 23(4):356-364.
Jyothi, S. et al., "Compliance with the quality standards of National Diabetic Retinopathy Screening Committee," Primary Care Diabetes, Jun. 18, 2009, 3:67-72.
Goh, J. K. H. et al., "Retinal Imaging Techniques for Diabetic Retinopathy Screening," Journal of Diabetes Science and Technology, 2016, 10(2):282-294, Diabetes Technology Society.

Olson, J. et al., "Improving the economic value of photographic screening for optical coherence tomography-detectable macular oedema: a prospective, multicentre, UK study," Health Technology Assessment, Nov. 2013, 17(51):1-162, Queen's Printer and Controller of HMSO 2013.
Leal, J. et al., "Cost-effectiveness of digital surveillance clinics with optical coherence tomography versus hospital eye service follow-up for patients with screen-positive maculopathy," Eye, Nov. 30, 2018, 33:640-647.
Bressler, S. B. et al., "Reproducibility of Spectral Domain Optical Coherence Tomography Retinal Thickness Measurements and Conversion to Equivalent Time Domain Metrics in Diabetic Macular Edema," JAMA Ophthalmol, Sep. 2014, 132(9):1113-1122.
Giani, A. et al., "Reproducibility of Retinal Thickness Measurements on Normal and Pathologic Eyes by Different Optical Coherence Tomography Instruments," American Journal of Ophthalmology, Dec. 2010, 150:815-824, Elsevier Inc.
De Fauw, J. et al., "Clinically applicable deep learning for diagnosis and referral in retinal disease," Nature Medicine, Sep. 2018, 24:1342-1350.
Kermany, D. S. et al., "Identifying Medical Diagnoses and Treatable Diseases by Image-Based Deep Learning," Cell, Feb. 22, 2018, 172:1-20, Elsevier Inc.
Lemaître, G. et al., "Classification of SD-OCT Volumes Using Local Binary Patterns: Experimental Validation for DME Detection," Journal of Ophthalmology, 2016, pp. 1-14.
Roy, A. G. et al., "ReLayNet: retinal layer and fluid segmentation of macular optical coherence tomography using fully convolutional networks," Biomedical Optics Express, Aug. 1, 2017, 8(8):1-16.
Rasti, R. et al., "Macular OCT Classification Using a Multi-Scale Convolutional Neural Network Ensemble," IEEE Transactions on Medical Imaging, Apr. 2018, 37(4):1024-1034, IEEE.
Schlegl, T. et al., "Fully Automated Detection and Quantification of Macular Fluid in OCT Using Deep Learning," American Academy of Ophthalmology, Apr. 2018, 125(4):549-558, American Academy of Ophthalmology.
Patrao, N. V. et al., "Real-World Outcomes of Ranibizumab Treatment for Diabetic Macular Edema in a United Kingdom National Health Service Setting," American Journal of Ophthalmology, Dec. 2016, 172:51-57, Elsevier Inc.
Wells, J. A. et al., "Aflibercept, Bevacizumab, or Ranibizumab for Diabetic Macular Edema," N Engl J Med., Mar. 26, 2015, 372(13):1-18, Massachusetts Medical Society.
Lee, C. S. et al., "Deep-learning based, automated segmentation of macular edema in optical coherence tomography," Biomedical Optics Express, Jul. 2017, 8(7):1-9.
Tsuji, T. et al., "Classification of optical coherence tomography images using a capsule network," BMC Ophthalmology, 2020, 20(114):1-9.
Ran, A. R. et al., "Deep learning in glaucoma with optical coherence tomography: a review," Eye, Oct. 7, 2020, 35:188-201.
Xu, Z. et al., "Automated diagnoses of age-related macular degeneration and polypoidal choroidal vasculopathy using bi-modal deep convolutional neural networks," Br J Ophthalmol, 2021, 105:561-566.
Sun, Y. et al., "Automatic diagnosis of macular diseases from OCT volume based on its two-dimensional feature map and convolutional neural network with attention mechanism," Journal of Biomedical Optics, Sep. 2020, 25 (9):1-15.
Quan, J. et al., "Diabetes incidence and prevalence in Hong Kong, China during 2006-2014," Diabetic Medicine, 2017, 34:902-908, Diabetes UK.

* cited by examiner

MULTI-TASK DEEP-LEARNING METHOD AND SYSTEM TO CLASSIFY DIABETIC MACULAR EDEMA FOR DIFFERENT OPTICAL COHERENCE TOMOGRAPHY DEVICES

BACKGROUND OF THE INVENTION

Diabetic macular edema (DME) is the primary cause of vision loss among individuals with diabetes mellitus (DM) and can develop at any stage of diabetic retinopathy (DR).[1] Although substantial international guidelines and national programs for the screening of DR already exist for preventing vision loss among such individuals,[2-7] these programs mostly run on two-dimensional (2D) retinal fundus photographs with limited performance in screening for DME. Because DME is a three-dimensional (3D) condition involving edematous thickening of the macula, screening for DME using 2D retinal fundus photographs has reportedly led to very high false-positive rates (for example, >86% in tests carried out in Hong Kong and >79% in tests carried out in the UK), thereby increasing the number of non-DME cases unnecessarily referred to ophthalmologists and straining the clinical resources.[8,9] Furthermore, there is an increasing awareness for differentiating eyes with center-involved DME (CI-DME)—which are more likely to have visual impairments and require more timely management strategies, for example, intravitreal injections of anti-vascular endothelial growth factor, compared to eyes with non-CI-DME—for which needs for treatment may be less urgent—to obtain the most cost-effective outcomes for patients with DM.[7]

Optical coherence tomography (OCT), particularly spectral-domain or Fourier-domain OCT, is a non-invasive technique for imaging 3D layered retinal structures within seconds. It has been proposed as an alternative screening tool for DME,[10,11] particularly as a second-line screening tool for the screen-positive results based on 2D retinal fundus photographs.[12] However, the identification of DME from OCT images, as well as the classification into the CI-DME and non-CI-DME subtypes, still requires human assessment either by ophthalmologists or professionally trained technicians and graders, who may need to manually review multiple cross-sectional OCT B-scan images from the volumetric scan slice-by-slice. While OCT viewing platforms have some built-in automated features, for example, macular thickness, central subfield thickness, comparison of normative databases, it is still very challenging to perform the comparisons across different commercial OCT devices due to their unique manufacturer algorithms and normative databases.[13,14]

Over the last few years, several automated deep-learning (DL) systems for DME detection and fluid segmentation from OCT images have been developed.[15-20] Studies investigating these systems demonstrate that the DL algorithms can accurately detect DME from OCT images, thereby having the potential to enhance and speed up clinical workflows through automated image interpretation.[15] However, several critical issues remain. First, most of the proposed DL algorithms have been trained and tested on OCT images obtained from a single commercial device in a single center, lacking external datasets to test the generalizability of the DL algorithms. Second and more importantly, no studies up to date have tested these algorithms on their performance in classifying DME into CI-DME and non-CI-DME subgroups, which could be crucial for triaging the patients into timely referral intervals or specialized clinics such as retina clinics.

BRIEF SUMMARY OF THE INVENTION

There continues to be a need in the art for improved designs and techniques for methods and systems for analyzing optical coherence tomography (OCT) images to identify DME.

According to an embodiment of the subject invention, a deep-learning method for analyzing optical coherence tomography (OCT) images based on a convolutional neural network (CNN) is provided. The method comprises extracting a feature from one or more three-dimensional OCT volumetric scan images; and classifying the OCT images with respect to diabetic macular edema (DME) based on results of the step of extracting a feature. The step of extracting a feature from one or more three-dimensional OCT volumetric scan images is performed by a neural network. The neural network can be based on a ResNet-34 architecture. The step of classifying the OCT images comprises classifying the OCT images into a DME classification group or a non-DME retinal abnormalities classification group. The step of classifying the OCT images into a DME classification group comprises classifying the OCT images into one of three sub classification groups including a no-DME group, a non-center-involved DME group, and a center-involved DME group. The step of classifying the OCT images into a non-DME retinal abnormalities classification group comprises classifying the OCT images into one of two sub classification groups including a presence of non-DME retinal abnormalities group and an absence of non-DME retinal abnormalities group. The deep-learning based image analysis method may further comprises extracting a feature from one or more two-dimensional OCT B-scan images; and classifying the OCT images with respect to diabetic macular edema (DME) based on results of the step of extracting feature. The step of extracting a feature from one or more two-dimensional OCT B-scan images is performed by a neural network. The neural network can be a ResNet-18 architecture.

In certain embodiment of the subject invention, a system for analyzing optical coherence tomography (OCT) images based on a convolutional neural network (CNN) is provided. The system comprises a three-dimensional (3D) feature extracting module extracting a feature from one or more 3D OCT volumetric scan images; and a 3D classifying module classifying the OCT images with respect to diabetic macular edema (DME) based on results of output from the feature extracting module. The 3D feature extracting module comprises a neural network configured to extract the feature. The neural network can be based on a ResNet-34 architecture. The 3D classifying module comprises a DME classification module and a non-DME retinal abnormalities classification module. The DME classification module is configured to classify the OCT images into one of three sub classification groups including a no-DME group, a non-center-involved DME group, and a center-involved DME group. The non-DME retinal abnormalities classification module is configured to classify the OCT images into one of two sub classification groups including a presence of non-DME retinal abnormalities group and an absence of non-DME retinal abnormalities group. The system may further comprise a two-dimensional (2D) feature extracting module configured to extract a feature from one or more 2D OCT B-scan images, and a 2D classifying module configured to classify the 2D OCT images with respect to diabetic macular edema (DME) based on results of results output from the feature extracting module. The 2D feature extracting module comprises a neural network configured to extract the feature. The neural network of the 2D feature extracting module can be a ResNet-18 architecture. The predictions made by the 3D CNN are at the volume-scan level, whereas those made by the 2D CNN are at the B-scan level. To obtain the subsequent volume-scan level results for Spectralis OCT and Triton OCT based on the 2D CNNs at the B-scan level, following presence-based strategy is applied: (1) if any B-scans are predicted as center-involved center-involved-DME, the whole scan is classified as center-involved-DME; (2) if (1) does not hold and at least one B-scan is predicted as non-center-involved-DME, the whole scan is classified as non-center-involved-DME; and (3) if both (1) and (2) do not hold, the whole scan is classified as non-DME.

In some embodiments of the subject invention, a non-transitory computer readable medium having stored therein program instructions executable by a computing system to cause the computing system to perform a method is provided. The method comprises extracting a feature from one or more three-dimensional OCT volumetric scan images; and classifying the OCT images with respect to diabetic macular edema (DME) based on results of the step of extracting a feature. The step of extracting a feature from one or more three-dimensional OCT volumetric scan images is performed by a neural network trained by minimizing an objective function L before testing.

DETAILED DISCLOSURE OF THE INVENTION

The embodiments of subject invention pertain to a multi-task deep-learning method and systems for analyzing optical coherence tomography (OCT) images to identify DME based on a convolutional neural network (CNN).

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1A:
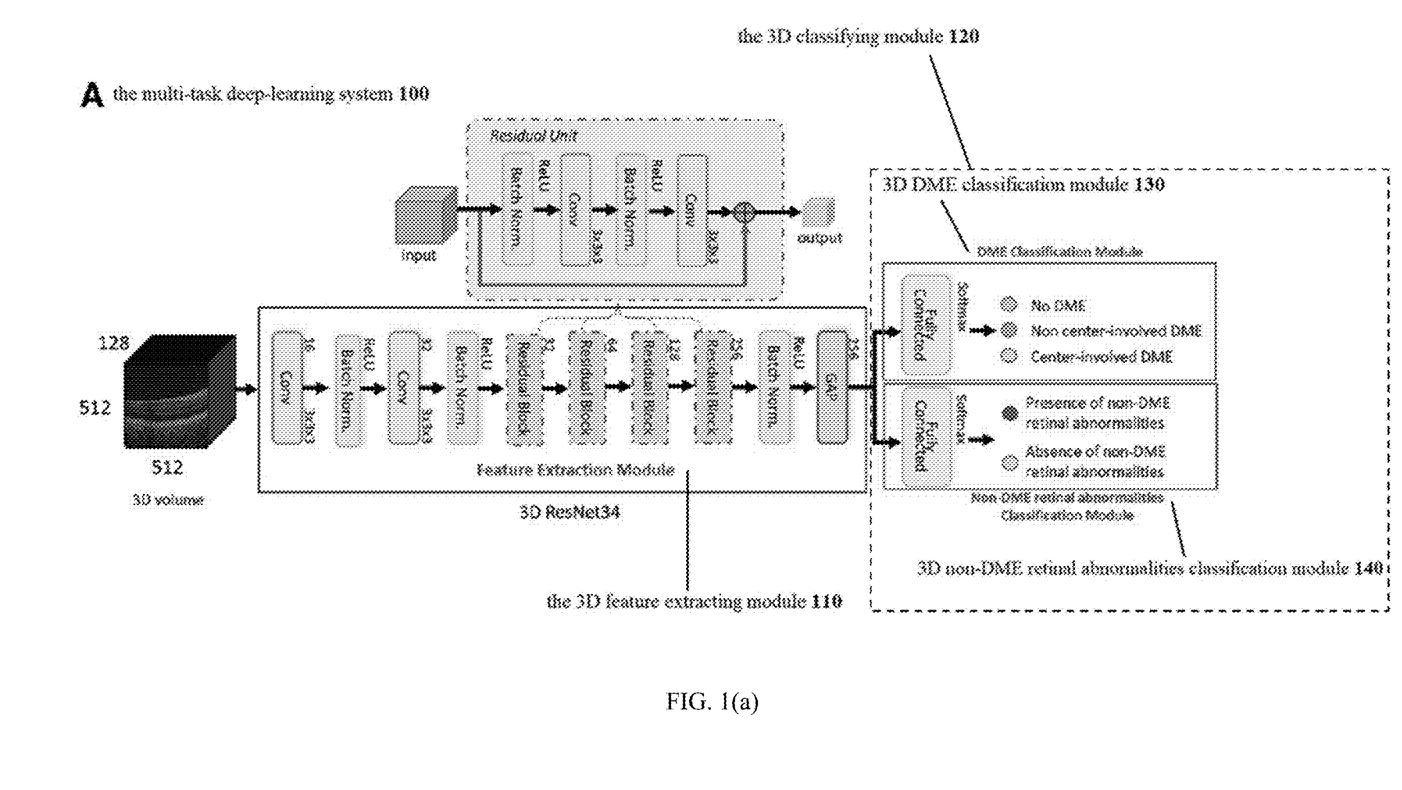
FIG. 1(a) is a schematic representation of a 3D multi-task convolutional neural network (CNN) for analyzing 3D OCT volumetric scan images, according to an embodiment of the subject invention.
Figure 1B:
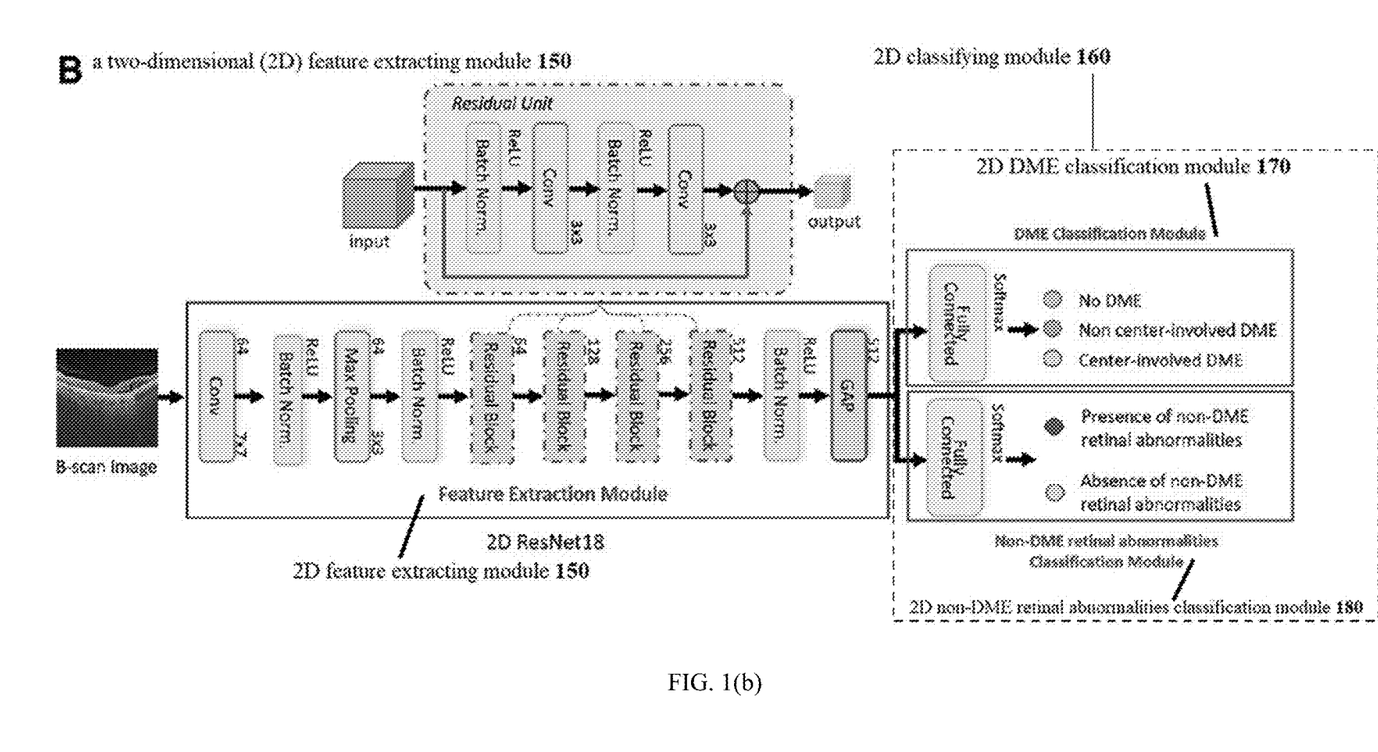
FIG. 1(b) is a 2D multi-task CNN for analyzing 2D B-scan images, according to an embodiment of the subject invention.

Referring to FIGS. 1(a) and 1(b), embodiments of the multi-task deep-learning system of the subject invention are based on a segmentation-free classification approach to perform automated classification of DME from images obtained from OCT devices such as Cirrus OCT, Spectralis OCT, and Triton OCT.

As illustrated in FIG. 1(a), the multi-task deep-learning system 100 of the subject invention for analyzing optical coherence tomography (OCT) images comprises a three-dimensional (3D) feature extracting module 110 extracting a feature from one or more 3D OCT volumetric scan images and a 3D classifying module 120 classifying the OCT images with respect to diabetic macular edema (DME) based on results received from the 3D feature extracting module 110 which includes a convolutional neural network (CNN) having residual network (ResNet) architecture such as ResNet-34 as the backbone and is configured for extracting the feature.

In one embodiment, the ResNet-34 of the feature extraction module 110 is employed with the last fully connected layer removed and the number of feature maps is a half of the original setting to reduce the computational costs.

Referring to FIG. 1(a) again, the 3D classifying module 120 includes a 3D DME classification module 130 and a 3D non-DME retinal abnormalities classification module 140. The DME classification module 130 can be configured to classify the OCT images into one of three subclassification groups including a no-DME subclassification group, a noncenter-involved DME subclassification group, and a center-involved DME subclassification group. On the other hand, the non-DME retinal abnormalities classification module 140 is configured to classify the OCT images into one of two sub-classification groups including a presence of non-DME retinal abnormalities subclassification group and an absence of non-DME retinal abnormalities subclassification group.

Now referring to FIG. 1(*b*), the multi-task deep-learning system 100 of the subject invention can further comprise a two-dimensional (2D) feature extracting module 150 configured to extract a feature from one or more 2D OCT B-scan images and a 2D classifying module 160 configured to classify the 2D OCT images with respect to diabetic macular edema (DME) based on the results received from the 2D feature extracting module 150 which includes a convolutional neural network (CNN) having residual network (ResNet) architecture such as ResNet-18 as the backbone and is configured for extracting the feature.

In one embodiment, the ResNet-18 of the 2D feature extraction module 150 is employed with the last fully connected layer removed and the number of feature maps is a half of the original setting to reduce the computational costs.

Referring to FIG. 1(*b*) again, the 2D classifying module 160 includes a 2D DME classification module 170 and a 2D non-DME retinal abnormalities classification module 180. The 2D DME classification module 170 can be configured to classify the OCT images into one of three subclassification groups including a no-DME subclassification group, a non-center-involved DME subclassification group, and a center-involved DME subclassification group. The 2D non-DME retinal abnormalities classification module 180 can be configured to classify the OCT images into one of two sub-classification groups including a presence of non-DME retinal abnormalities subclassification group and an absence of non-DME retinal abnormalities subclassification group.

According to different scanning protocols for each device, the 3D deep convolutional neural network (CNN) 110 is trained to screen for DME based on the 3D volume-scan images obtained from a first OCT device such as Cirrus OCT, followed by the 2D CNN 150 based on the one or more 2D B-scan images obtained from two other types of OCT devices such as Spectralis OCT and Triton OCT. Then, the DME cases are classified into center-involved-DME and non-center-involved-DME subgroups. Next, the two deep CNNs are trained to simultaneously detect retinal abnormalities other than DME, for example, age-related macular degeneration, epiretinal membrane abnormalities, central serous chorioretinopathy, and macular holes based on images from the three types of OCT devices.

In one embodiment, the following presence-based strategy is applied to obtain per-scan (volume) level results for the 2D CNN: (1) if any B-scans are predicted as center-involved-DME, the whole scans are classified as center-involved-DME; (2) if (1) does not hold and at least one B-scan is predicted as non-center-involved-DME, the whole scans are classified as non-center-involved-DME; (3) if both (1) and (2) do not hold, the whole scans are classified as non-DME.

In one embodiment, the 3D classifying module 120 and the 2D classifying module 160 each includes a fully connected layer with Softmax activation accepted features from the corresponding feature extraction module and output class probabilities into the corresponding DME classification module and non-DME retinal abnormalities classification module. Both the 3D network and the 2D network of the subject invention are trained by minimizing the objective function L, as shown by the equations below:

$$L_{DME} = -\sum_{c=1}^{C} y_{DME,c} \log(p_{DME,c} \mid x, \theta)$$

$$L_{ABN} = -(y_{ABN} \log(p(y_{ABN} = 1 \mid x, \theta)) + (1 - y_{ABN}) \log(p(y_{ABN} = 0 \mid x, \theta)))$$

$$L = L_{DME} + L_{ABN} + \lambda \|W\|_2^2$$

In the equations above, L DME is the cross-entropy loss for the DME classification task, and $L_{ABN}$ is the binary cross-entropy loss for the abnormality classification task. $\theta=8$ represents the model parameters, x is the input image, and $y_{DME}$ and $y_{ABN}$ are the corresponding labels for DME and abnormality, respectively. C is the number of classes, for example, 3, for the DME classification task. A regularization term W is added to the objective function to inhibit the problem of overfitting. $\lambda$ controls the trade-off between the loss terms and the regularization term, with a set value of $3 \times 10^{-5}$.

The presence of DME is defined as either perceptible retinal thickening or the presence of DME features (for example, intra-retinal cystoid spaces, subretinal fluid and hard exudates) in the macula. Among eyes with DME, center-involved-DME is defined as either retinal thickening or the presence of DME features in the macula involving the central subfield zone (for example, 1 mm in diameter), whereas non-center-involved-DME is defined as retinal thickening or the presence of DME features in the macula not involving the central subfield zone. Retinal thickening is defined according to DRCR.net protocol-defined thresholds ($\geq 320$ µm for men and $\geq 305$ µm for women on Spectralis OCT; $\geq 305$ µm for men and $\geq 290$ µm for women on Cirrus OCT) and the Moorfields DME study ($\geq 350$ µm on Topcon OCT).

In one embodiment, the 3D and 2D CNNs are implemented by Keras package (https://keras.io/) and Python, working on a workstation equipped with a 3.5 GHz Intel® Core™ i7-5930K CPU and Nvidia GeForce GTX Titan X GPUs. The learning rate is set at 0.0001 and the weights of the networks are optimized based on the Adam stochastic gradient descent method.

The predictions made by the 3D CNN are at the volume-scan level, whereas these made by the 2D CNN are at the B-scan level. To obtain subsequent "volume-scan" level results for the Spectralis OCT device and the Triton OCT device using the 2D CNN, a presence-based strategy is applied: (1) if any B-scans are predicted as center-involved-DME, the whole scans are classified as center-involved-DME; (2) if (1) does not hold and at least one B-scan is predicted as non-center-involved-DME, the whole scans are classified as non-center-involved-DME; (3) if both (1) and (2) do not hold, the whole scans are classified as non-DME.

The outcomes of the multi-task deep-learning system of the subject invention are the probabilities of "absence of DME", "presence of non-center-involved-DME", "presence of center-involved-DME", "absence of other retinal abnormalities", and "presence of other retinal abnormalities" for each eye of the test subject. A presence-based strategy is also applied to provide subsequent referral suggestion: (1) if presence of any types of DME or other retinal abnormalities is predicted, the test subject will be suggested to refer to eye doctors; (2) if there is absence of any DME and other retinal abnormalities, "observation only" is suggested.

Figure 2A:
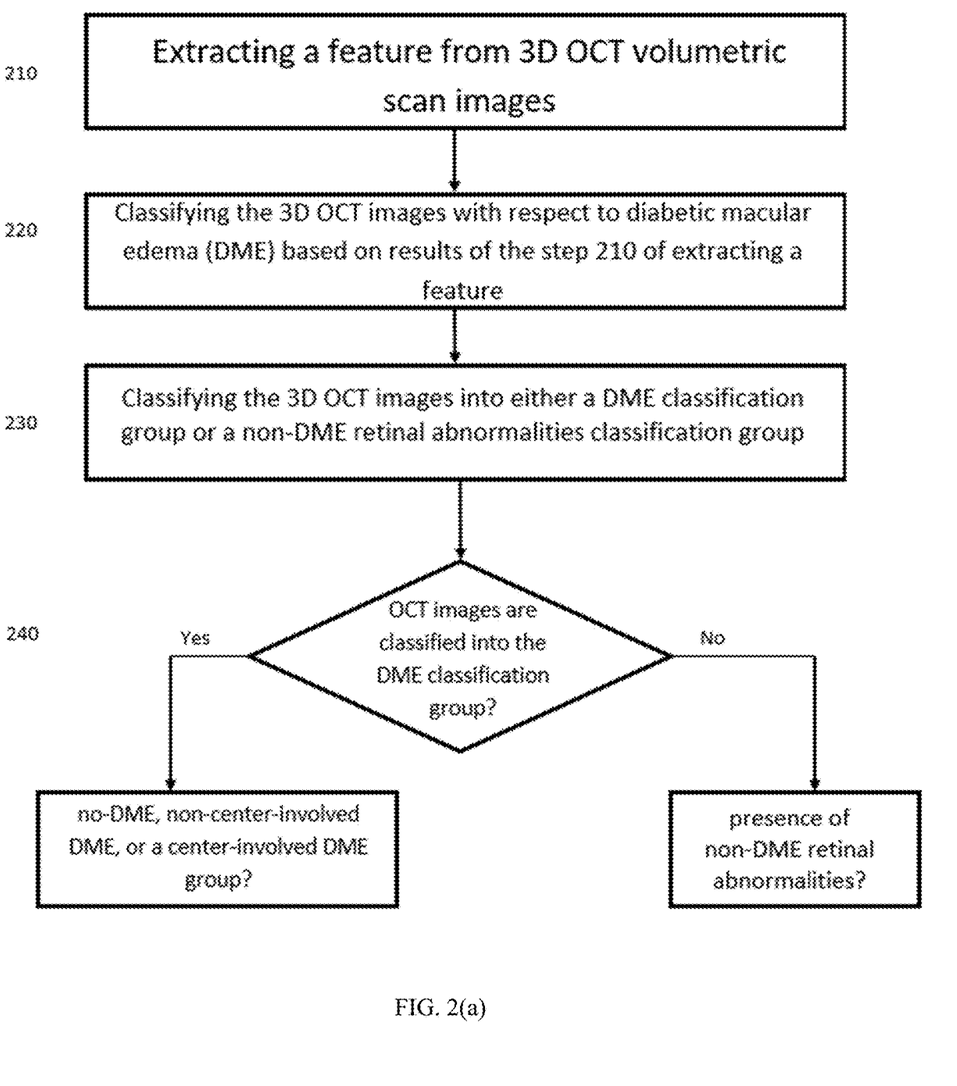
FIGS. 2(a)-2(b) show flow charts illustrating the deep-learning method for analyzing optical coherence tomography (OCT) images based on convolutional neural networks, according to an embodiment of the subject invention.
Figure 2B:
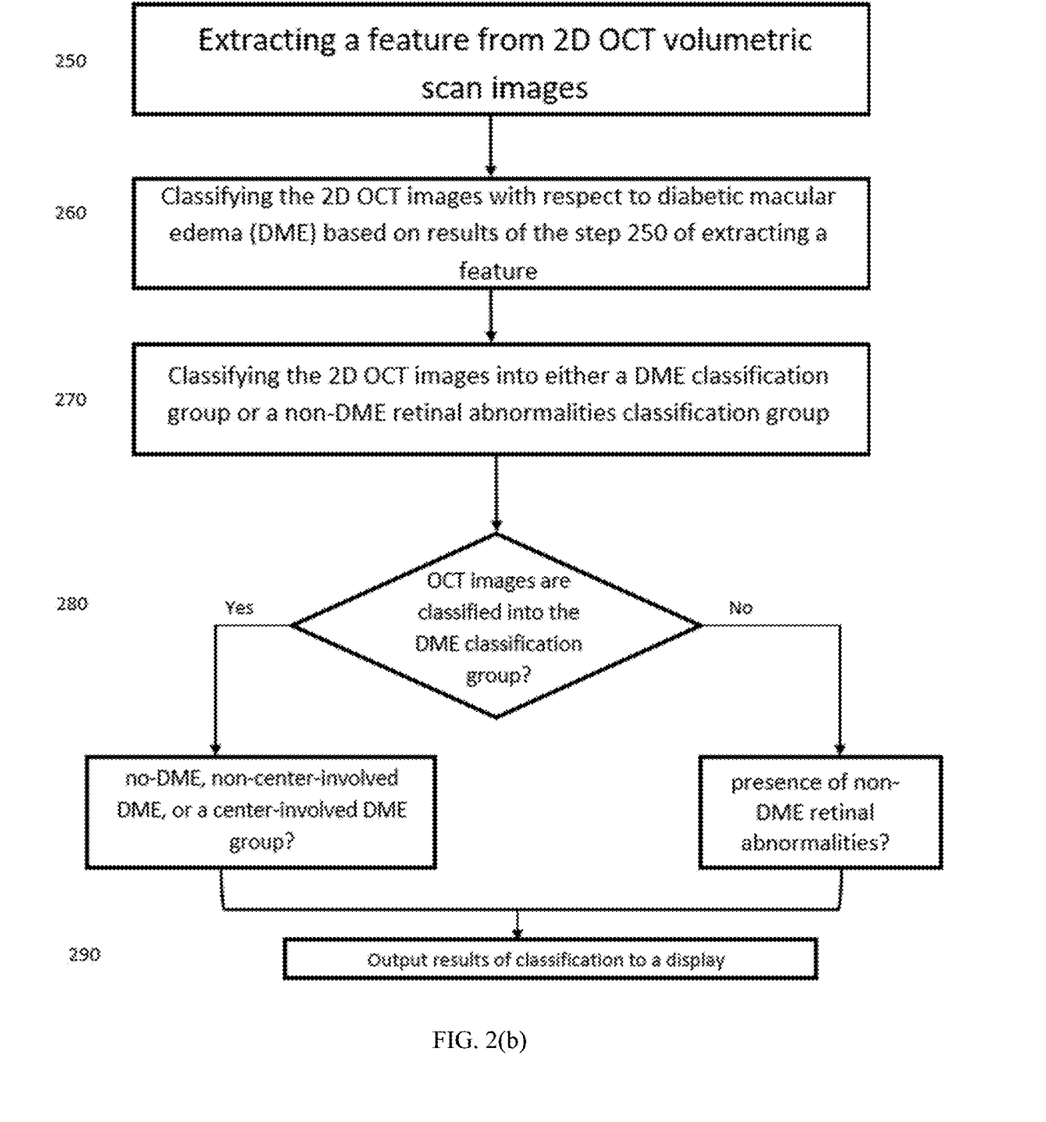

FIGS. 2(a)-2(b) show flow charts illustrating steps of a deep-learning method for analyzing optical coherence tomography (OCT) images based on convolutional neural networks. In FIG. 2(a), at a step 210, a feature is extracted from one or more three-dimensional (3D) OCT volumetric scan images. Next, at a step 220, the one or more OCT images are classified with respect to diabetic macular edema (DME) based on results of the step 210 of extracting a feature. In one embodiment, the step 210 of extracting a feature from one or more 3D OCT volumetric scan images is performed by a neural network such as a neural network based on a ResNet-34 architecture.

Moreover, the step 220 of classifying the OCT images can comprise a step 230 of classifying the OCT images into either a DME classification group or a non-DME retinal abnormalities classification group. When the OCT images are classified into the DME classification group at the step 240, the OCT images can be further classified into one of three subclassification groups including a no-DME subclassification group, a non-center-involved DME subclassification group, and a center-involved DME subclassification group.

On the other hand, when the OCT images are classified into the non-DME retinal abnormalities classification group at the step 240, the OCT images can be further classified into one of two subclassification groups including a presence of non-DME retinal abnormalities subclassification group and an absence of non-DME retinal abnormalities subclassification group.

The deep-learning method can further comprise a step 250 of extracting a feature from one or more two-dimensional (2D) OCT B-scan images and a step 260 of classifying the OCT images with respect to DME based on results of the step 250 of extracting feature.

In one embodiment, the step 250 of extracting a feature from one or more 2D OCT B-scan images is performed by a neural network such as a neural network based on a ResNet-18 architecture.

When the OCT images are classified into the DME classification group at the step 260, the OCT images can be further classified into one of three subclassification groups including a no-DME subclassification group, a non-center-involved DME subclassification group, and a center-involved DME subclassification group at a step 270.

On the other hand, when the OCT images are classified into the non-DME retinal abnormalities classification group at the step 250, the OCT images can be further classified into one of two subclassification groups including a presence of non-DME retinal abnormalities subclassification group and an absence of non-DME retinal abnormalities subclassification group at a step 280.

The classification results are then output to a display at a step 290.

In certain embodiments, a non-transitory computer readable medium having stored therein program instructions executable by a computing system to cause the computing system to perform a method is provided. The method can comprise extracting a feature from one or more three-dimensional OCT volumetric scan images and classifying the OCT images with respect to diabetic macular edema (DME) based on results of the step of extracting a feature. The step of extracting a feature from one or more three-dimensional OCT volumetric scan images is performed by a neural network trained by minimizing an objective function L before testing.

Comparison with Conventional DL Systems

Most conventional deep-learning systems for DME detection based on OCT images have mainly been trained and tested using cross-sectional B-scans.[16-19, 23, 24] In contrast, the multi-task deep-learning system of the subject invention based on CNN is trained to detect DME by 3D volume-scans obtained from OCT devices and achieves performance comparable to that of the conventional deep-learning systems.

Application of the 3D volume-scan brings about substantial merits for the deep-learning system and method training. For instance, for the conventional deep-learning systems, it is difficult and time-consuming for experts to label numerous B-scans in order to conduct supervised system training. On the other hand, training the CNN with labeled images from the volume-scan level can reduce of the burden of labeling work while at the same time maintaining excellent performance. En-face imaging is another OCT imaging tool for retinal visualization. However, en-face images may not be informative in applying deep-learning system to detect DME, as DME is a 3D condition. It is noted that the "volume-scan" level results for Spectralis OCT and Triton OCT are obtained from predictions made for series of B-scans according to the presence-based strategy described above.

The second advantage of the multi-task deep-learning system of the subject invention is the classification of DME into CI-DME and non-CI-DME subgroups. This subgroup categorization of DME is clinically important for DR screening, as it determines the reexamination frequency, the necessity and timing for referral to ophthalmologists, and the treatment recommendations in different resource settings, according to the International Council of Ophthalmology (ICO) Guidelines for diabetic eye care.[7] The subclassification of DME helps triage patients more effectively in DR screening programs, reducing false-positives, conserving resources—especially in low-resource or intermediate-resource regions or countries, enabling ophthalmologists to prioritize patients who need prompt treatment for preventing vision loss, and allowing for better utilization of costly specialist care resources and shorter hospital wait times.

The third advantage of the multi-task deep-learning system of the subject invention is the ability of the deep-learning system to detect non-DME retinal conditions. Most conventional DL systems only focus on one disease other than DME.[17, 18, 23, 27] The multi-task deep-learning system of the subject invention goes beyond previous work by detecting non-DME retinal abnormalities among individuals with DM, enhancing the applicability of the DL system in real-world screening settings. Training such a system to achieve good performance using OCT images with multiple diseases besides DME may be difficult, given that some diseases are uncommon and some ocular changes, for example, epiretinal membrane and age-related macular degeneration, share similar features to DME. However, the approach of the subject invention to detecting multiple diseases is relevant and representative of the populations for DR screening.

The fourth advantage of the multi-task deep-learning system of the subject invention is its applicability to three commonly available OCT devices. Conventional technologies have focused on one or, at most, two of the three types of commercial OCT devices.[15, 16, 18, 20, 23, 24, 28] The CNNs of the subject invention are trained to detect DME based on images obtained from all three different commercial OCT devices, making the screening more generalizable. A common challenge is that while the Digital Imaging and Communication Medicine (DICOM) standard ensures a reasonable consistency among OCT images from different manufacturers, OCT images are often stored in a compressed format that may result in losses of information. Therefore, the multi-task deep-learning system of the subject invention is trained using raw data, for example, IMG files from Cirrus OCT, E2E files from Spectralis OCT, and FDS files from Triton OCT, exported from each OCT manufacturer's software. Thus, the multi-task deep-learning system of the subject invention represents a machine-agnostic platform applicable to a wider range of OCT modalities.

Tests

A total of 100,727 OCT images, representing 4,261 eyes from 2,329 subjects with DM, are utilized for development, primary validation, and external testing. These images include 7,006 volume-scans from Cirrus OCT, 48,810 B-scans from Spectralis OCT, and 44,911 B-scans from Triton OCT.

The characteristics of the study participants in both the primary dataset and the external testing datasets are summarized in Table 1 below.

TABLE 1

Summary of Primary and External Testing datasets for Training, Validating, and Testing the Multi-task Deep-learning System

| Dataset | OCT device | Total sample (n = 100,727 images) | Sample for DME classification module | | | Sample for non-DME retinal abnormalities classification module | |
|---|---|---|---|---|---|---|---|
| | | | No DME | Non-CI-DME | CI-DME | Absence | Presence |
| Primary | Cirrus HD-OCT | No. of OCT volumes | 2580 | 413 | 795 | 3405 | 383 |
| | | No. of eyes | 655 | 69 | 215 | 828 | 111 |
| | | No. of subjects | 295 | 38 | 141 | 402 | 72 |
| | | Gender (male, %) | 136 (46.1) | 21 (55.3) | 82 (58.2) | 209 (52.0) | 30 (41.7) |
| | | Age (years, SD) | 60.8 (15.4) | 62.7 (11.6) | 63.7 (9.2) | 60.6 (13.8) | 68.0 (10.6) |
| | Spectralis OCT | No. of OCT volumes | 864 | 203 | 328 | 1040 | 355 |
| | | No. of OCT B-scans | 25073 | 4392 | 1050 | 25815 | 4700 |
| | | No. of eyes | 368 | 74 | 103 | 383 | 162 |
| | | No. of subjects | 164 | 36 | 74 | 171 | 103 |
| | | Gender (male, %) | 84 (51.2) | 17 (47.2) | 50 (67.6) | 95 (55.6) | 56 (54.4) |
| | | Age (years, SD) | 59.5 (15.6) | 64.2 (10.1) | 62.2 (11.2) | 58.3 (14.9) | 65.4 (10.7) |
| | Triton OCT | No. of OCT volumes | 2121 | 421 | 790 | 2163 | 1169 |
| | | No. of OCT B-scans | 31639 | 2171 | 5633 | 30280 | 9163 |
| | | No. of eyes | 575 | 89 | 296 | 538 | 427 |
| | | No. of subjects | 267 | 37 | 186 | 263 | 227 |
| | | Gender (male, %) | 133 (49.8) | 16 (43.2) | 92 (49.5) | 117 (44.5) | 124 (54.6) |
| | | Age (years, SD) | 60.4 (14.9) | 63.5 (12.7) | 64.5 (12.7) | 61.9 (12.9) | 62.3 (13.6) |
| External-1 (Singapore-SERI) | Cirrus HD-OCT | No. of OCT volumes | 2320 | 19 | 26 | 2292 | 73 |
| | | No. of eyes | 1349 | 11 | 18 | 1330 | 48 |
| | | No. of subjects | 663 | 9 | 25 | 654 | 43 |
| | | Gender (male, %) | 395 (59.6) | 5 (55.6) | 11 (44.0) | 381 (58.3) | 30 (69.8) |
| | | Age (years, SD) | 59.5 (9.2) | 53.8 (6.1) | 58.3 (7.9) | 58.3 (9.1) | 61.6 (9.8) |
| External-2 (Hong Kong-AHNH) | Cirrus HD-OCT | No. of OCT volumes | 412 | 69 | 178 | 486 | 173 |
| | | No. of eyes | 355 | 64 | 154 | 422 | 151 |
| | | No. of subjects | 141 | 34 | 117 | 186 | 106 |
| | | Gender (male, %) | 86 (61.0) | 23 (67.6) | 72 (61.5) | 116 (62.4) | 65 (61.3) |
| | | Age (years, SD) | 69.1 (9.81) | 61.2 (15.6) | 64.8 (9.0) | 65.5 (11.2) | 69.2 (8.4) |
| External-3 (US-Stanford) | Cirrus HD-OCT | No. of OCT volumes | 96 | 42 | 56 | 151 | 43 |
| | | No. of eyes | 96 | 42 | 56 | 151 | 43 |
| | | No. of subjects | 48 | 18 | 40 | 71 | 35 |
| | | Gender (male, %) | 22 (45.8) | 6 (33.3) | 16 (40.0) | 24 (33.8) | 20 (57.1) |
| | | Age (years, SD) | 60.44 (12.0) | 62.8 (10.7) | 65.5 (10.8) | 65.9 (11.3) | 68.8 (9.2) |
| External-4 (China-Aier) | Spectralis OCT | No. of OCT volumes | 172 | 3 | 27 | 172 | 30 |
| | | No. of OCT B-scans | 3352 | 309 | 81 | 3541 | 201 |
| | | No. of eyes | 172 | 3 | 27 | 172 | 30 |
| | | No. of subjects | 104 | 3 | 21 | 101 | 25 |
| | | Gender (male, %) | 61 (58.7) | 1 (33.3) | 10 (47.6) | 58 (57.4) | 14 (56.0) |
| | | Age (years, SD) | 57.2 (10.0) | 69.8 (5.41) | 63.0 (11.6) | 58.2 (10.2) | 61.2 (13.1) |
| External-5 (Australia-WIMR) | Spectralis OCT | No. of OCT volumes | 46 | 36 | 121 | 178 | 25 |
| | | No. of OCT B-scans | 3578 | 1151 | 361 | 4588 | 502 |
| | | No. of eyes | 46 | 36 | 121 | 178 | 25 |
| | | No. of subjects | 11 | 11 | 81 | 87 | 16 |
| | | Gender (male, %) | 6 (54.5) | 5 (45.5) | 53 (65.4) | 55 (63.2) | 9 (56.3) |
| | | Age (years, SD) | 54.2 (14.7) | 54.5 (5.7) | 62.2 (8.4) | 59.5 (9.7) | 65.6 (6.9) |
| External-6 (Hong Kong-UCH) | Spectralis OCT | No. of OCT volumes | 53 | 50 | 296 | 327 | 72 |
| | | No. of OCT B-scans | 3980 | 4484 | 999 | 8361 | 1102 |
| | | No. of eyes | 53 | 50 | 296 | 327 | 72 |
| | | No. of subjects | 11 | 14 | 191 | 160 | 56 |
| | | Gender (male, %) | 5 (45.5) | 9 (64.3) | 119 (62.3) | 84 (52.5) | 35 (62.5) |
| | | Age (years, SD) | 66.5 (11.6) | 61.7 (9.1) | 67.2 (9.8) | 65.9 (10.5) | 69.4 (7.6) |

TABLE 1-continued

Summary of Primary and External Testing datasets for Training, Validating, and Testing the Multi-task Deep-learning System

| Dataset | OCT device | Total sample (n = 100,727 images) | Sample for DME classification module | | | Sample for non-DME retinal abnormalities classification module | |
|---|---|---|---|---|---|---|---|
| | | | No DME | Non-CI-DME | CI-DME | Absence | Presence |
| External-7 (China-JSIEC) | Triton OCT | No. of OCT volumes | 36 | 23 | 394 | 116 | 337 |
| | | No. of OCT B-scans | 1295 | 507 | 3666 | 4872 | 596 |
| | | No. of eyes | 36 | 23 | 394 | 116 | 337 |
| | | No. of subjects | 29 | 17 | 280 | 54 | 272 |
| | | Gender (male, %) | 11 (37.9) | 4 (23.6) | 128 (45.7) | 20 (37.0) | 120 (44.1) |
| | | Age (years, SD) | 57.2 (12.8) | 60.0 (7.7) | 58.9 (8.8) | 59.0 (10.4) | 58.7 (9.0) |

In Table 1, CI-DME represents center-involved diabetic macular edema; OCT represents optical coherence tomography; SD represents standard deviation; Aier represents Aier School of Ophthalmology, Central South University, Changsha, Hunan, China; AHNH represents Alice Ho Miu Ling Nethersole Hospital, Hong Kong SAR; JSIEC represents Joint Shantou International Eye Center, Shantou University and the Chinese University of Hong Kong, Shantou, Guangdong, China; SERI represents Singapore Eye Research Institute, Singapore National Eye Center, Singapore; Stanford represents Byers Eye Institute at Stanford, Stanford University School of Medicine, Palo Alto, CA, USA; UCH represents United Christian Hospital, Hong Kong SAR; and WIMR represents Westmead Institute for Medical Research, University of Sydney, Sydney, NSW, Australia.

The discriminative performance of the DL system in DME classification (presence versus absence of DME) for the primary validation and external testing datasets at volume-scan level is summarized in Table 2 below. For the primary dataset, the DL system achieved AUROCs of 0.937 (95% CI 0.920-0.954), 0.958 (95% CI 0.930-0.977), and 0.965 (95% CI 0.948-0.977), among images obtained from the Cirrus, Spectralis, and Triton OCTs respectively; with sensitivities of 87.4%, 92.7%, and 94.3%; specificities of 100%, 98.9%, and 98.6%; and accuracies of 96.4%, 96.3%, and 96.9%. For classifying CI-DME and non-CI-DME among eyes with any DME, the DL system achieved AUROCs of 0.968 (95% CI 0.940-0.995), 0.951 (95% CI 0.898-0.982), and 0.975 (95% CI 0.947-0.991) among images obtained from the Cirrus, Spectralis, and Triton OCTs respectively; with sensitivities of 95.8%, 92.3%, and 98.9%; specificities of 97.8%, 97.9%, and 96.2%; and accuracies of 96.3%, 94.4%, and 98.0%. For the external datasets, the discriminative performance of the DL system using different OCT devices is similar to that for the primary dataset. For the classification of any DME, the ranges for AUROCs, sensitivity, specificity and accuracy are 0.906-0.956, 81.4%-100.0%, 89.7%-100.0%, and 92.6%-99.5%, respectively. For the classification of CI-DME and non-CI-DME, the ranges for AUROCs, sensitivity, specificity and accuracy are 0.894-1.000, 87.1%-100.0%, 85.7%-100.0%, and 91.3%-100.0%, respectively.

TABLE 2

Discriminative Performance of the Multi-task Deep-learning System in the Classification of Diabetic Macular Edema (DME) and Center-involved DME (CI-DME) across Primary Validation and External Testing Datasets

| Classification task | OCT device | Dataset | AUROC (95% CI) | Sensitivity, % (95% CI) | Specificity, % (95% CI) | Accuracy, % (95% CI) |
|---|---|---|---|---|---|---|
| Presence vs. absence of DME | Cirrus HD-OCT | Primary | 0.937 (0.920-0.954) | 87.4 (82.7-91.6) | 100.0 (100.0-100.0) | 96.4 (95.1-97.6) |
| | | External-1 | 0.906 (0.947-0.968) | 81.4 (69.8-93.0) | 99.8 (99.6-100.0) | 99.5 (99.2-99.7) |
| | | External-2 | 0.929 (0.907-0.947) | 89.5 (85.1-93.0) | 96.3 (93.9-97.9) | 93.6 (91.5-95.4) |
| | | External-3 | 0.930 (0.894-0.965) | 86.0 (78.5-92.5) | 100.0 (100.0-100.0) | 93.5 (90.0-96.5) |
| | Spectralis OCT | Primary | 0.958 (0.930-0.977) | 92.7 (86.9-96.4) | 98.9 (96.3-99.9) | 96.3 (93.7-98.1) |
| | | External-4 | 0.956 (0.935-0.978) | 100.0 (100.0-100.0) | 91.3 (86.6-95.4) | 92.6 (88.6-96.0) |
| | | External-5 | 0.936 (0.879-0.994) | 97.6 (95.2-99.4) | 89.7 (75.9-100.0) | 96.4 (93.8-98.5) |
| | | External-6 | 0.949 (0.922-0.977) | 96.4 (94.2-98.4) | 93.4 (87.9-97.8) | 95.7 (93.7-97.5) |
| | Triton OCT | Primary | 0.965 (0.948-0.977) | 94.3 (90.9-96.8) | 98.6 (96.9-99.5) | 96.9 (95.4-98.1) |
| | | External-7 | 0.954 (0.930-0.971) | 99.3 (97.9-99.9) | 91.7 (77.5-98.3) | 98.6 (97.1-99.5) |
| CI-DME vs. non-CI-DME | Cirrus HD-OCT | Primary | 0.968 (0.940-0.995) | 95.8 (92.3-95.6) | 97.8 (93.3-100.00) | 96.3 (93.1-98.9) |
| | | External-1 | 0.939 (0.851-1.000) | 95.5 (86.4-100.0) | 92.3 (76.9-100.0) | 94.3 (85.7-100.0) |
| | | Externa-2 | 0.894 (0.847-0.931) | 87.1 (81.1-91.8) | 91.7 (81.6-97.2) | 88.3 (83.5-92.2) |
| | | External-3 | 1.000 (1.000-1.000) | 100.0 (100.0-100.0) | 100.0 (100.0-100.0) | 100.0 (100.0-100.0) |
| | Spectralis | Primary | 0.951 | 92.3 | 97.9 | 94.4 |

TABLE 2-continued

Discriminative Performance of the Multi-task Deep-learning System in
the Classification of Diabetic Macular Edema (DME) and Center-involved
DME (CI-DME) across Primary Validation and External Testing Datasets

| Classification task | OCT device | Dataset | AUROC (95% CI) | Sensitivity, % (95% CI) | Specificity, % (95% CI) | Accuracy, % (95% CI) |
|---|---|---|---|---|---|---|
| | OCT | | (0.898-0.982) | (84.0-97.1) | (88.9-99.9) | (88.9-97.7) |
| | | External-4 | 0.929 | 88.9 | 100.0 | 90.0 |
| | | | (0.863-0.995) | (71.0-97.6) | (29.2-100.0) | (0.735-0.979) |
| | | External-5 | 0.899 | 94.0 | 85.7 | 91.3 |
| | | | (0.851-0.947) | (89.5-97.7) | (76.2-93.7) | (87.2-94.9) |
| | | External-6 | 0.934 | 94.2 | 92.5 | 93.7 |
| | | | (0.905-0.962) | (91.4-96.6) | (86.9-97.2) | (91.5-96.0) |
| | Triton OCT | Primary | 0.975 | 98.9 | 96.2 | 98.0 |
| | | | (0.947-0.991) | (95.9-99.9) | (89.2-99.2) | (95.4-99.4) |
| | | External-7 | 0.975 | 100.0 | 95.0 | 99.8 |
| | | | (0.955-0.988) | (99.1-100.0) | (75.1-99.9) | (98.7-100.0) |

In Table 2, AUROC represents area under the receiver operating characteristic curve; CI-DME represents center-involved diabetic macular edema; CI represents confidence interval; and OCT represents optical coherence tomography.

The performance of the DL system in classifying the presence or absence of non-DME retinal abnormalities at volume-scan level is summarized in Table 3 below. For the primary dataset, the AUROCs are 0.948 (95% CI 0.930-0.963), 0.949 (95% CI 0.901-0.996), and 0.938 (95% CI 0.915-0.960) among images obtained from the Cirrus, Spectralis, and Triton OCTs respectively, with sensitivities of 93.0%, 93.1%, and 97.2%, specificities of 89.4%, 96.6%, and 90.3%, and accuracies of 89.9%, 96.3%, and 91.0%. The performance in external datasets remained excellent, with the ranges for AUROCs, sensitivity, specificity and accuracy being 0.901-0.969, 84.2%-99.6%, 80.6%-98.8%, and 91.0%-98.0%, respectively.

Figure 3:
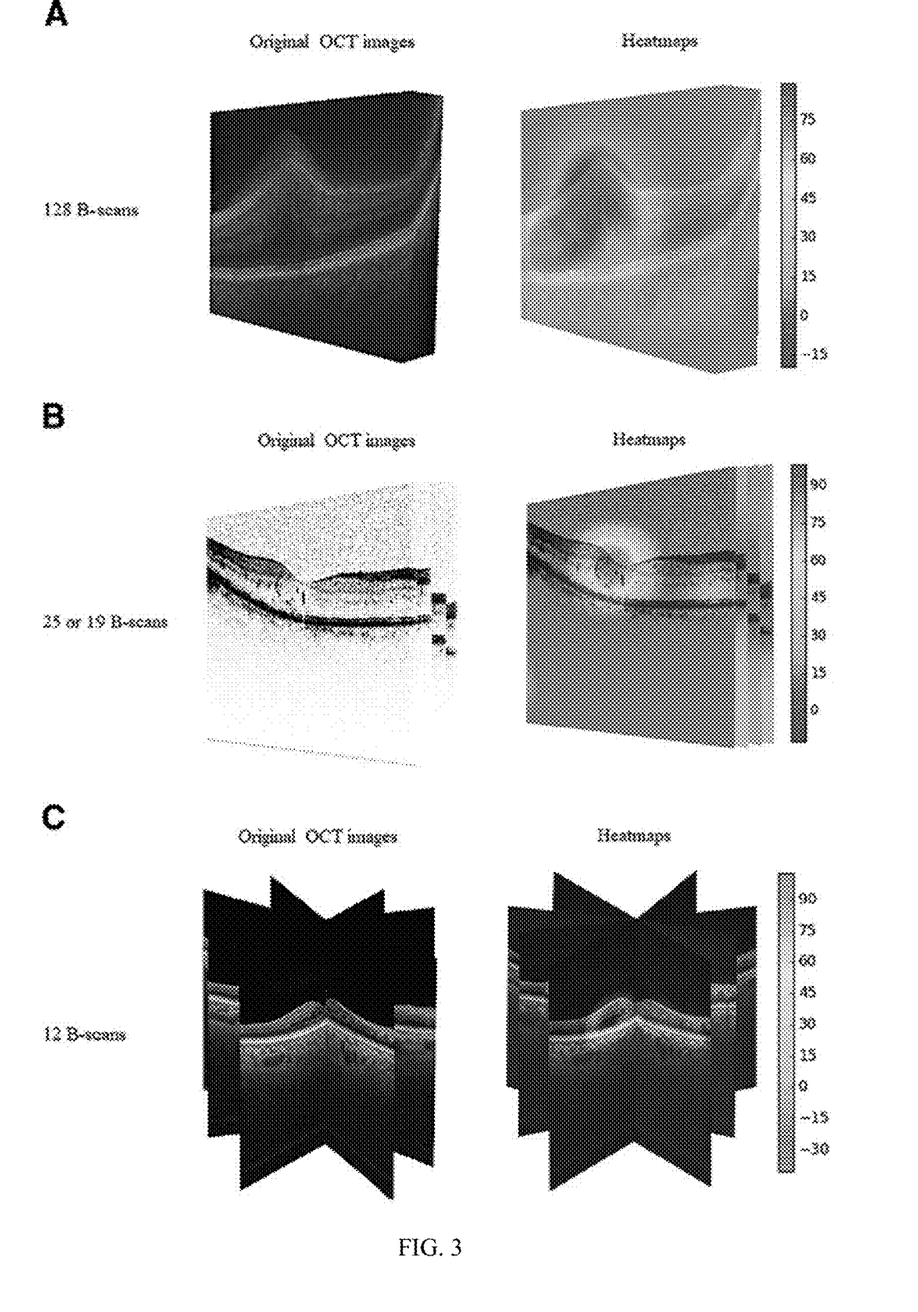
FIGS. 3(a)-3(c) show exemplary images of eyes with DME and corresponding heatmaps, wherein DME is identified from Cirrus HD-OCT images by the 3D CNN in FIG. 3(a), from Spectralis OCT images by the 2D CNN in FIG. 3(b), and from Triton OCT images by the 2D CNN in FIG. 3(c), and wherein in the heatmaps of FIGS. 3(a)-3(c), the colored area indicates the gradient of discriminatory power for classifying the presence or absence of DME, an orange-red color indicates the greatest relative discriminatory power, while a green-blue color indicates the least relative discriminatory power, according to an embodiment of the subject invention.

Triton OCT images in FIG. 3(c). In the heatmaps of FIGS. 3(a)-3(c), the colored area indicates the gradient of discriminatory power for classifying the presence or absence of DME, an orange-red color indicates the greatest relative discriminatory power, while a green-blue color indicates the least relative discriminatory power.

Figure 4A:
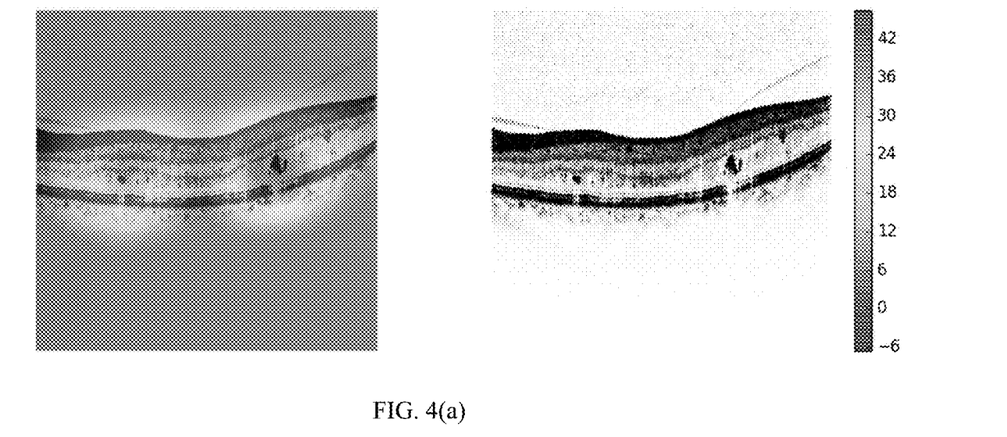
FIGS. 4(a)-4(b) show exemplary images of eyes with DME and corresponding heatmaps of the 2D feature extracting module, wherein DME is identified from Spectralis OCT images in FIG. 4(a) and from Triton OCT images in FIG. 4(b), according to an embodiment of the subject invention.
Figure 4B:
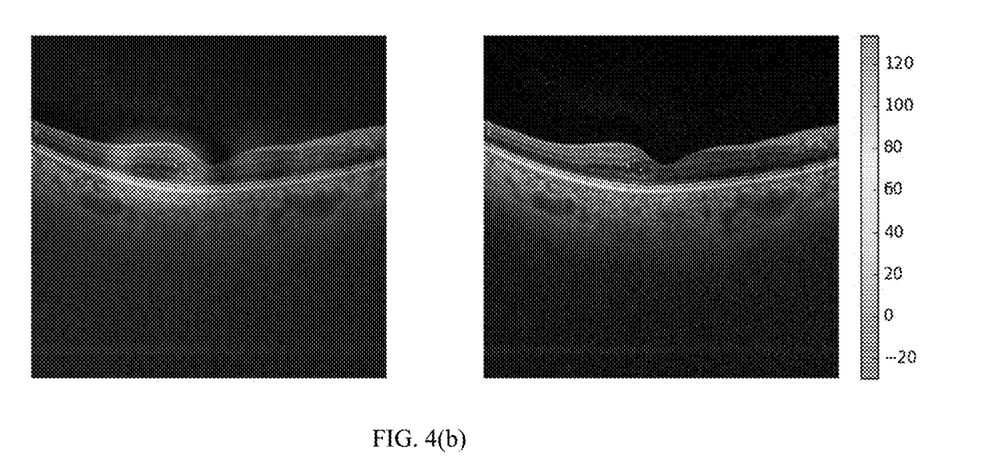

Moreover, FIGS. 4(a)-4(b) show exemplary images of eyes with DME and corresponding heatmaps of the 2D feature extracting module, wherein DME is identified from Spectralis OCT images in FIG. 4(a) and from Triton OCT images in FIG. 4(b).

In further analysis, as the volume-scan level results for Spectralis OCT and Triton OCT are made by 2D CNNs at

TABLE 3

Discriminative Performance of the Multi-task Deep-learning System in the Classification
of Non-DME Retinal Abnormalities across Primary Validation and External Testing Datasets

| Classification task | OCT device | Dataset | AUROC (95% CI) | Sensitivity, % (95% CI) | Specificity, % (95% CI) | Accuracy, % (95% CI) |
|---|---|---|---|---|---|---|
| Presence vs. absence of non-DME retinal abnormalities | Cirrus HD-OCT | Primary | 0.948 | 93.0 | 89.4 | 89.9 |
| | | | (0.930-0.963) | (86.8-96.9) | (86.7-91.7) | (87.6-92.0) |
| | | External-1 | 0.969 | 90.4 | 97.9 | 97.7 |
| | | | (0.941-0.996) | (83.6-97.3) | (89.4-96.3) | (89.6-99.3) |
| | | External-2 | 0.915 | 91.0 | 88.7 | 89.2 |
| | | | (0.891-0.935) | (85.2-95.1) | (85.4-91.3) | (86.7-91.5) |
| | | External-3 | 0.898 | 84.2 | 92.6 | 91.0 |
| | | | (0.830-0.966) | (71.1-94.7) | (88.3-96.3) | (87.0-94.5) |
| | Spectralis OCT | Primary | 0.949 | 93.1 | 96.6 | 96.3 |
| | | | (0.901-0.996) | (82.8-100.0) | (94.3-98.7) | (94.2-98.2) |
| | | External-4 | 0.940 | 96.7 | 91.3 | 92.1 |
| | | | (0.901-0.979) | (0.900-100.0) | (82.6-95.4) | (85.2-95.5) |
| | | External-5 | 0.960 | 93.1 | 98.8 | 98.0 |
| | | | (0.912-1.000) | (82.8-100.0) | (97.0-100.0) | (95.9-99.5) |
| | | External-6 | 0.901 | 99.6 | 80.6 | 93.2 |
| | | | (0.867-0.935) | (98.9-100.0) | (73.9-87.3) | (90.5-95.5) |
| | Triton OCT | Primary | 0.938 | 97.2 | 90.3 | 91.0 |
| | | | (0.915-0.960) | (93.1-100.0) | (87.8-92.6) | (88.9-93.1) |
| | | External-7 | 0.926 | 90.5 | 94.7 | 93.6 |
| | | | (0.897-0.955) | (85.3-95.7) | (92.0-96.7) | (91.4-95.8) |

In Table 3, AUROC represents area under the receiver operating characteristic curve; CI-DME represents center-involved diabetic macular edema; CI represents confidence interval; and OCT represents optical coherence tomography.

FIGS. 3(a)-3(c) show examples of images of eyes with DME for each of the three OCT devices and their corresponding heatmaps, demonstrating the ability of the multi-task deep-learning system of subject invention for determining features related to DME identification. In particular, DME is identified from Cirrus HD-OCT images in FIG. 3(a), from Spectralis OCT images in FIG. 3(b), and from the B-scan level with a presence-based strategy, the performances are further tested for the classification of any DME as summarized in Table 4 below and of any non-DME retinal abnormalities as summarized in Table 5 below at the B-scan level. The performances are also tested when only one scan from one eye is included in Table 6 and Table 7 below in the primary dataset.

TABLE 4

Discriminative Performance of the Multi-task Deep-learning System in the Classification of Diabetic Macular Edema (DME) and Center-involved DME (CI-DME) at the B-scan Level across Primary Validation and External Testing Datasets

| Classification task | OCT device | Dataset | AUROC (95% CI) | Sensitivity, % (95% CI) | Specificity, % (95% CI) | Accuracy, % (95% CI) |
|---|---|---|---|---|---|---|
| Presence vs. absence of DME | Spectralis OCT | Primary | 0.940 (0.934-0.945) | 88.7 (86.9-90.3) | 99.2 (99.0-99.5) | 97.2 (96.8-97.6) |
| | | External-4 | 0.958 (0.951-0.964) | 92.9 (89.6-95.3) | 98.7 (98.3-99.1) | 98.2 (97.7-98.6) |
| | | External-5 | 0.959 (0.953-0.964) | 95.5 (94.5-96.4) | 96.3 (95.6-96.9) | 96.0 (95.5-96.6) |
| | | External-6 | 0.899 (0.893-0.905) | 80.4 (78.9-81.8) | 99.4 (99.2-99.6) | 93.6 (93.0-94.0) |
| | Triton OCT | Primary | 0.937 (0.931-0.942) | 88.5 (86.9-90.0) | 98.8 (98.5-99.0) | 96.8 (96.4-97.2) |
| | | External-7 | 0.947 (0.941-0.953) | 97.5 (97.0-98.0) | 92.0 (90.4-100.0) | 96.1 (95.6-96.1) |
| CI-DME vs. non-CI-DME | Spectralis OCT | Primary | 0.940 (0.927-0.954) | 90.3 (85.6-93.8) | 98.1 (97.0-98.8) | 96.1 (95.4-97.6) |
| | | External-4 | 0.959 (0.932-0.978) | 96.4 (89.9-99.3) | 95.4 (92.0-97.7) | 95.7 (92.9-97.6) |
| | | External-5 | 0.956 (0.945-0.965) | 93.8 (90.8-96.0) | 97.4 (96.3-98.1) | 96.6 (95.6-97.4) |
| | | External-6 | 0.905 (0.892-0.916) | 99.4 (98.7-99.8) | 81.6 (79.4-83.6) | 89.2 (87.9-90.4) |
| | Triton OCT | Primary | 0.951 (0.938-0.961) | 93.6 (91.9-95.0) | 96.5 (94.1-98.1) | 94.4 (93.0-95.5) |
| | | External-7 | 0.952 (0.945-0.959) | 99.5 (99.2-99.7) | 90.1 (86.5-94.3) | 99.0 (98.6-99.3) |

In Table 4, AUROC represents area under the receiver operating characteristic curve; CI-DME represents center-involved diabetic macular edema; CI represents confidence interval; and OCT represents optical coherence tomography.

TABLE 5

Discriminative Performance of the Multi-task Deep-learning System in the Classification of Non-DME Retinal Abnormalities at the B-scan Level across Primary Validation and External Testing Datasets

| Classification task | OCT device | Dataset | AUROC (95% CI) | Sensitivity, % (95% CI) | Specificity, % (95% CI) | Accuracy, % (95% CI) |
|---|---|---|---|---|---|---|
| Presence vs. absence of non-DME retinal abnormalities | Spectralis OCT | Primary | 0.975 (0.971-0.979) | 95.5 (92.3-97.6) | 90.7 (90.0-91.4) | 90.9 (90.2-91.6) |
| | | External-4 | 0.977 (0.972-0.982) | 97.0 (93.5-98.9) | 89.3 (88.2-90.3) | 89.7 (88.7-90.7) |
| | | External-5 | 0.988 (0.985-0.991) | 95.7 (93.3-97.4) | 94.8 (94.1-95.4) | 94.9 (94.2-95.5) |
| | | External-6 | 0.924 (0.919-0.929) | 86.7 (85.4-88.0) | 92.6 (92.0-93.2) | 91.1 (90.5-91.6) |
| | Triton OCT | Primary | 0.962 (0.958-0.966) | 95.3 (92.8-97.1) | 94.1 (93.5-94.6) | 94.2 (93.6-94.7) |
| | | External-7 | 0.948 (0.942-0.954) | 86.8 (83.9-89.3) | 91.9 (91.1-92.6) | 91.3 (90.5-92.0) |

In Table 5, AUROC represents area under the receiver operating characteristic curve; CI-DME represents center-involved diabetic macular edema; CI represents confidence interval; and OCT represents optical coherence tomography.

TABLE 6

Diagnostic Performance of the Deep-learning System in DME Detection When Only One Scan from One Eye is Included in the Primary Dataset

| Classification task | OCT device | Dataset | AUROC (95% CI) | Sensitivity, % (95% CI) | Specificity, % (95% CI) | Accuracy, % (95% CI) |
|---|---|---|---|---|---|---|
| Presence vs. absence of DME | Cirrus HD-OCT | Primary | 0.915 (0.867-0.950) | 82.9 (67.9-92.8) | 100.0 (97.7-100.0) | 96.5 (92.9-98.6) |
| | Spectralis OCT | Primary | 0.938 (0.877-0.975) | 88.9 (73.9-96.9) | 98.7 (93.1-100.0) | 95.6 (90.1-98.6) |
| | Triton OCT | Primary | 0.989 (0.962-0.998) | 98.5 (92.1-100.0) | 99.2 (95.7-100.0) | 99.0 (96.3-99.9) |

TABLE 6-continued

Diagnostic Performance of the Deep-learning System in DME Detection
When Only One Scan from One Eye is Included in the Primary Dataset

| Classification task | OCT device | Dataset | AUROC (95% CI) | Sensitivity, % (95% CI) | Specificity, % (95% CI) | Accuracy, % (95% CI) |
| --- | --- | --- | --- | --- | --- | --- |
| CI-DME vs. non-CI-DME | Cirrus HD-OCT | Primary | 0.966 (0.839-0.999) | 93.1 (77.2-99.2) | 100.0 (47.8-100.0) | 94.1 (80.3-99.3) |
| | Spectralis OCT | Primary | 0.952 (0.813-0.996) | 90.5 (69.6-98.8) | 100.0 (71.5-100.0) | 93.8 (79.2-99.2) |
| | Triton OCT | Primary | 0.974 (0.902-0.997) | 100.0 (92.6-100.0) | 94.7 (74.0-99.9) | 98.5 (92.0-100.0) |

In Table 6, AUROC represents area under the receiver operating characteristic curve; CI represents confidence interval; and OCT represents optical coherence tomography.

TABLE 7

Diagnostic Performance of the Deep-learning System in Non-DME Retinal Abnormalities Detection
Performances When Only One Scan from One Eye is Included in the Primary Dataset

| Classification task | OCT device | Dataset | AUROC (95% CI) | Sensitivity, % (95% CI) | Specificity, % (95% CI) | Accuracy, % (95% CI) |
| --- | --- | --- | --- | --- | --- | --- |
| Presence vs. absence of non-DME retinal abnormalities | Cirrus HD-OCT | Primary | 0.938 (0.895-0.967) | 93.3 (81.7-98.6) | 88.9 (82.8-93.4) | 89.9 (84.8-93.3) |
| | Spectralis OCT | Primary | 0.993 (0.955-0.999) | 91.7 (61.5-99.8) | 100.0 (96.5-100.0) | 99.1 (95.3-100.0) |
| | Triton OCT | Primary | 0.978 (0.946-0.994) | 100.0 (82.4-100.0) | 92.6 (87.6-96.0) | 93.3 (88.8-96.4) |

In Table 7, AUROC represents area under the receiver operating characteristic curve; CI represents confidence interval; and OCT represents optical coherence tomography.

The multi-task deep-learning method and system of the subject invention may incorporate OCT into current retinal fundus photography-based DR screening programs as a second-line screening tool, allowing for the efficient and reliable detection of DME, resulting in reductions in over-referrals and increased clinical use of multi-task deep-learning method and systems.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Tang F, Wang X, Ran A R, Chan C K M, Ho M, Yip W, Young A L, Lok J, Szeto S, Chan J, Yip F, Wong R, Tang Z, Yang D, Ng D S, Chen U, Brelen M, Chu V, Li K, Lai T H T, Tan G S, Ting D S W, Huang H, Chen H, Ma J H, Tang S, Leng T, Kakavand S, Mannil S S, Chang R T, Liew G, Gopinath B, Lai T Y Y, Pang C P, Scanlon P H, Wong T Y, Tham C C, Chen H, Heng P A, Cheung C Y. A Multitask Deep-Learning System to Classify Diabetic Macular Edema for Different Optical Coherence Tomography Devices: A Multicenter Analysis. Diabetes Care. 2021 September; 44(9):2078-2088. doi: 10.2337/dc20-3064. Epub 2021 Jul. 27.
2. Sun Z, Tang F, Wong R, Lok J, Szeto S K H, Chan J C K, Chan C K M, Tham C C, Ng D S, Cheung C Y. OCT Angiography Metrics Predict Progression of Diabetic Retinopathy and Development of Diabetic Macular Edema: A Prospective Study. Ophthalmology. 2019 December; 126(12):1675-1684. doi: 10.1016/j.ophtha.2019.06.016. Epub 2019 Jun. 26. Erratum in: Ophthalmology. 2020 December; 127(12):1777.
3. Ran A R, Cheung C Y, Wang X, Chen H, Luo L, Chan P P, Wong M, Chang R T, Mannil S S, Young A L, Yung H, Pang C P, Heng P, Tham C C. Detection of glaucomatous optic neuropathy with spectral-domain optical coherence tomography: a retrospective training and validation deep-learning analysis. Lancet Digit Heal, 1 (4) (2019), pp. e172-e182
4. Cheung C Y. OCT Angiography Metrics Predict Progression of Diabetic Retinopathy and Development of Diabetic Macular Edema: A Prospective Study. Ophthalmology. 2019 December; 126(12):1675-1684. doi: 10.1016/j.ophtha.2019.06.016.
5. Ting D S W, Cheung C Y, Lim G, Tan G S W, Quang N D, Gan A, Hamzah H, Garcia-Franco R, San Yeo I Y, Lee S Y, Wong E Y M, Sabanayagam C, Baskaran M, Ibrahim F, Tan N C, Finkelstein E A, Lamoureux E L, Wong I Y, Bressler N M, Sivaprasad S, Varma R, Jonas J B, He M G, Cheng C Y, Cheung G C M, Aung T, Hsu W, Lee M L, Wong T Y. Development and Validation of a Deep Learning System for Diabetic Retinopathy and Related Eye Diseases Using Retinal Images From Multiethnic Populations With Diabetes. JAMA. 2017 Dec. 12; 318 (22):2211-2223. doi: 10.1001/jama.2017.18152.
6. Tan G S, Cheung N, Simo R, et al. Diabetic macular oedema. Lancet Diabetes Endocrinol 2017; 5(2): 143-55.

7. Scanlon P H. The English National Screening Programme for diabetic retinopathy 2003-2016. Acta Diabetol 2017; 54(6):515-25.
8. Garvican L, Clowes J, Gillow T. Preservation of sight in diabetes: developing a national risk reduction programme. Diabet Med 2000; 17(9):627-34.
9. Nguyen H V, Tan G S, Tapp R J, et al. Cost-effectiveness of a National Telemedicine Diabetic Retinopathy Screening Program in Singapore. Ophthalmology 2016; 123(12): 2571-80.
10. Wang L Z, Cheung C Y, Tapp R J, et al. Availability and variability in guidelines on diabetic retinopathy screening in Asian countries. Br J Ophthalmol 2017; 101(10):1352-60.
11. Solomon S D, Chew E, Duh E J, et al. Diabetic Retinopathy: A Position Statement by the American Diabetes Association. Diabetes Care 2017; 40(3):412-8.
12. Wong T Y, Sun J, Kawasaki R, et al. Guidelines on Diabetic Eye Care: The International Council of Ophthalmology Recommendations for Screening, Follow-up, Referral, and Treatment Based on Resource Settings. Ophthalmology 2018; 125(10):1608-22.
13. Wong R L, Tsang C W, Wong D S, et al. Are we making good use of our public resources? The false-positive rate of screening by fundus photography for diabetic macular oedema. Hong Kong Med J 2017; 23(4):356-64.
14. Jyothi S, Elahi B, Srivastava A, et al. Compliance with the quality standards of National Diabetic Retinopathy Screening Committee. Prim Care Diabetes 2009; 3(2):67-72.
15. Goh J K, Cheung C Y, Sim S S, et al. Retinal Imaging Techniques for Diabetic Retinopathy Screening. J Diabetes Sci Technol 2016; 10(2):282-94.
16. Olson J, Sharp P, Goatman K, et al. Improving the economic value of photographic screening for optical coherence tomography-detectable macular oedema: a prospective, multicentre, UK study. Health Technol Assess 2013; 17(51):1-142.
17. Leal J, Luengo-Fernandez R, Stratton I M, et al. Cost-effectiveness of digital surveillance clinics with optical coherence tomography versus hospital eye service follow-up for patients with screen-positive maculopathy. 2019; 33(4):640-7.
18. Bressler S B, Edwards A R, Chalam K V, et al. Reproducibility of spectral-domain optical coherence tomography retinal thickness measurements and conversion to equivalent time-domain metrics in diabetic macular edema. JAMA Ophthalmol 2014; 132(9):1113-22.
19. Giani A, Cigada M, Choudhry N, et al. Reproducibility of retinal thickness measurements on normal and pathologic eyes by different optical coherence tomography instruments. Am J Ophthalmol 2010; 150(6):815-24.
20. De Fauw J, Ledsam J R, Romera-Paredes B, et al. Clinically applicable deep learning for diagnosis and referral in retinal disease. Nature Medicine 2018; 24(9): 1342-50.
21. Kermany D S, Goldbaum M, Cai W, et al. Identifying Medical Diagnoses and Treatable Diseases by Image-Based Deep Learning. Cell 2018; 172(5):1122-31.e9.
22. Lemaitre G, Rastgoo M, Massich J, et al. Classification of SD-OCT Volumes Using Local Binary Patterns: Experimental Validation for DME Detection. J Ophthalmol 2016; 2016:3298606.
23. Roy A G, Conjeti S, Karri S P K, et al. ReLayNet: retinal layer and fluid segmentation of macular optical coherence tomography using fully convolutional networks. Biomed Opt Express 2017; 8(8):3627-42.
24. Rasti R, Rabbani H, Mehridehnavi A, Hajizadeh F. Macular OCT Classification Using a Multi-Scale Convolutional Neural Network Ensemble. IEEE Trans Med Imaging 2018; 37(4):1024-34.
25. Schlegl T, Waldstein S M, Bogunovic H, et al. Fully Automated Detection and Quantification of Macular Fluid in OCT Using Deep Learning. Ophthalmology 2018; 125(4):549-58.
26. Patrao N V, Antao S, Egan C, et al. Real-World Outcomes of Ranibizumab Treatment for Diabetic Macular Edema in a United Kingdom National Health Service Setting. Am J Ophthalmol 2016; 172:51-7.
27. Wells J A, Glassman A R, Ayala A R, et al. Aflibercept, bevacizumab, or ranibizumab for diabetic macular edema. N Engl J Med 2015; 372(13):1193-203.
28. Lee C S, Tyring A J, Deruyter N P, et al. Deep-learning based, automated segmentation of macular edema in optical coherence tomography. Biomed Opt Express 2017; 8(7):3440-8.
29. Tsuji T, Hirose Y, Fujimori K, et al. Classification of optical coherence tomography images using a capsule network. BMC Ophthalmol 2020; 20(1):114.
30. Ran A R, Cheung C Y, Wang X, et al. Detection of glaucomatous optic neuropathy with spectral-domain optical coherence tomography: a retrospective training and validation deep-learning analysis. The Lancet Digital Health 2019; 1(4):e172-e82.
31. Ran A R, Tham C C, Chan P P, et al. Deep learning in glaucoma with optical coherence tomography: a review. Eye (London, England) 2020.
32. Xu Z, Wang W, Yang J, et al. Automated diagnoses of age-related macular degeneration and polypoidal choroidal vasculopathy using bi-modal deep convolutional neural networks. Br J Ophthalmol 2020.
33. Sun Y, Zhang H, Yao X. Automatic diagnosis of macular diseases from OCT volume based on its two-dimensional feature map and convolutional neural network with attention mechanism. J Biomed Opt 2020; 25(9).
34. Quan J, Li T K, Pang H, et al. Diabetes incidence and prevalence in Hong Kong, China during 2006-2014. Diabet Med 2017; 34(7):902-8.

We claim:

1. A deep-learning method for analyzing optical coherence tomography (OCT) images based on a convolutional neural network (CNN), comprising:
   extracting a feature from one or more three-dimensional OCT volumetric scan images; and
   classifying the OCT images, with respect to diabetic macular edema (DME) based on results of the step of extracting a feature, into either a DME classification group or a non-DME retinal abnormalities classification group, wherein the step of classifying the OCT images into a DME classification group comprises classifying the OCT images into one of three subclassification groups including a no-DME subclassification group, a non-center-involved DME subclassification group, and a center-involved DME subclassification group.

2. The deep-learning method of claim 1, wherein the step of extracting a feature from one or more three-dimensional OCT volumetric scan images is performed by a neural network.

3. The deep-learning method of claim 2, wherein the neural network is based on a ResNet-34 architecture.

4. The deep-learning method of claim 1, wherein the step of classifying the OCT images into a non-DME retinal abnormalities classification group comprises classifying the OCT images into one of two subclassification groups including a presence of non-DME retinal abnormalities subclassification group and an absence of non-DME retinal abnormalities subclassification group.

5. The deep-learning method of claim 1, further comprising extracting a feature from one or more two-dimensional (2D) OCT B-scan images; and classifying the OCT images with respect to diabetic macular edema (DME) based on results of the step of extracting feature.

6. The deep-learning method of claim 5, wherein the step of extracting a feature from one or more 2D OCT B-scan images is performed by a neural network.

7. The deep-learning method of claim 6, wherein the neural network performed on the one or more 2D OCT B-scan images is based on a ResNet-18 architecture.

8. A system for analyzing optical coherence tomography (OCT) images based on a convolutional neural network (CNN), comprising:
   a three-dimensional (3D) feature extracting module extracting a feature from one or more 3D OCT volumetric scan images; and
   a 3D classifying module classifying the OCT images with respect to diabetic macular edema (DME) based on results output from the 3D feature extracting module,
   wherein the 3D classifying module comprises a DME classification module and a non-DME retinal abnormalities classification module, and
   wherein the DME classification module is configured to classify the OCT images into one of three subclassification groups including a no-DME subclassification group, a non-center-involved DME subclassification group, and a center-involved DME subclassification group.

9. The system of claim 8, wherein the 3D feature extracting module comprises a neural network configured to extract the feature.

10. The system of claim 9, wherein the neural network is based on a ResNet-34 architecture.

11. The system of claim 8, wherein the non-DME retinal abnormalities classification module is configured to classify the OCT images into one of two subclassification groups including a presence of non-DME retinal abnormalities subclassification group and an absence of non-DME retinal abnormalities subclassification group.

12. The system of claim 8, further comprising a two-dimensional (2D) feature extracting module configured to extract a feature from one or more 2D OCT B-scan images; and a 2D classifying module configured to classify the 2D OCT images with respect to diabetic macular edema (DME) based on results output from the 2D feature extracting module.

13. The system of claim 12, wherein the 2D feature extracting module comprises a neural network configured to extract the feature.

14. The system of claim 13, wherein the neural network of the 2D feature extracting module is based on a ResNet-18 architecture.

15. A deep-learning method for analyzing optical coherence tomography (OCT) images based on a convolutional neural network (CNN), comprising:
   extracting a feature from one or more three-dimensional OCT volumetric scan images; and
   classifying the OCT images, with respect to diabetic macular edema (DME) based on results of the step of extracting a feature, into either a DME classification group or a non-DME retinal abnormalities classification group,
   wherein the step of classifying the OCT images into a non-DME retinal abnormalities classification group comprises classifying the OCT images into one of two subclassification groups including a presence of non-DME retinal abnormalities subclassification group and an absence of non-DME retinal abnormalities subclassification group.

16. A system for analyzing optical coherence tomography (OCT) images based on a convolutional neural network (CNN), comprising:
   a three-dimensional (3D) feature extracting module extracting a feature from one or more 3D OCT volumetric scan images; and
   a 3D classifying module classifying the OCT images with respect to diabetic macular edema (DME) based on results output from the 3D feature extracting module,
   wherein the 3D classifying module comprises a DME classification module and a non-DME retinal abnormalities classification module, and wherein the non-DME retinal abnormalities classification module is configured to classify the OCT images into one of two subclassification groups including a presence of non-DME retinal abnormalities subclassification group and an absence of non-DME retinal abnormalities subclassification group.

* * * * *